United States Patent
Atkins et al.

(10) Patent No.: US 11,745,867 B2
(45) Date of Patent: Sep. 5, 2023

(54) PYLON CONVERSION ACTUATOR FOR TILTROTOR AIRCRAFT

(71) Applicant: Bell Textron Inc., Fort Worth, TX (US)

(72) Inventors: William Atkins, Carrollton, TX (US); George Ryan Decker, Loveland, CO (US); Steven Allen Robedeau, Jr., Keller, TX (US)

(73) Assignee: Textron Innovations Inc., Providence, RI (US)

( * ) Notice: Subject to any disclaimer, the term of this patent is extended or adjusted under 35 U.S.C. 154(b) by 200 days.

(21) Appl. No.: 17/119,703

(22) Filed: Dec. 11, 2020

(65) Prior Publication Data

US 2022/0185469 A1 Jun. 16, 2022

(51) Int. Cl.
*B64C 29/00* (2006.01)
(52) U.S. Cl.
CPC .............................. *B64C 29/0033* (2013.01)
(58) Field of Classification Search
CPC . B64C 29/0033; B64C 29/0075; B64C 15/12; B64C 27/52
See application file for complete search history.

(56) References Cited

U.S. PATENT DOCUMENTS

| | | | | |
|---|---|---|---|---|
| 3,094,072 A | * | 6/1963 | Parilla | F02K 9/92 60/768 |
| 3,117,745 A | * | 1/1964 | Ellis, III | B64C 27/54 244/7 C |
| 3,766,790 A | * | 10/1973 | Weir | B64C 29/0033 475/8 |
| 5,709,357 A | * | 1/1998 | von Wilmowsky | B64C 27/52 244/17.23 |
| 6,247,667 B1 | * | 6/2001 | Fenny | B64C 29/0033 244/7 R |
| 6,276,633 B1 | | 8/2001 | Balayn et al. | |
| 10,065,743 B2 | | 9/2018 | King et al. | |
| 2012/0199699 A1 | | 8/2012 | Isaac et al. | |
| 2016/0347448 A1 | * | 12/2016 | Henning, Jr. | B64C 39/06 |
| 2019/0168861 A1 | * | 6/2019 | Fotouhie | B64D 27/26 |
| 2019/0389571 A1 | | 12/2019 | Gilliland et al. | |
| 2020/0031488 A1 | | 1/2020 | King et al. | |
| 2020/0333805 A1 | | 10/2020 | English et al. | |
| 2021/0107639 A1 | * | 4/2021 | Hymer | B64C 27/22 |
| 2021/0229797 A1 | * | 7/2021 | Horn | B64D 31/06 |

* cited by examiner

*Primary Examiner* — Tien Q Dinh
*Assistant Examiner* — William L Gmoser
(74) *Attorney, Agent, or Firm* — Bradley Arant Boult Cummings LLP

(57) ABSTRACT

A pylon conversion actuator, for use in tiltrotor aircraft, that converts the tiltrotor between hover flight mode and forward flight mode. Pylon conversion actuator selectively retracts and extends between a retracted position to an extended position. Pylon conversion actuator includes an extendable arm, a motor, and an actuator platform.

16 Claims, 12 Drawing Sheets

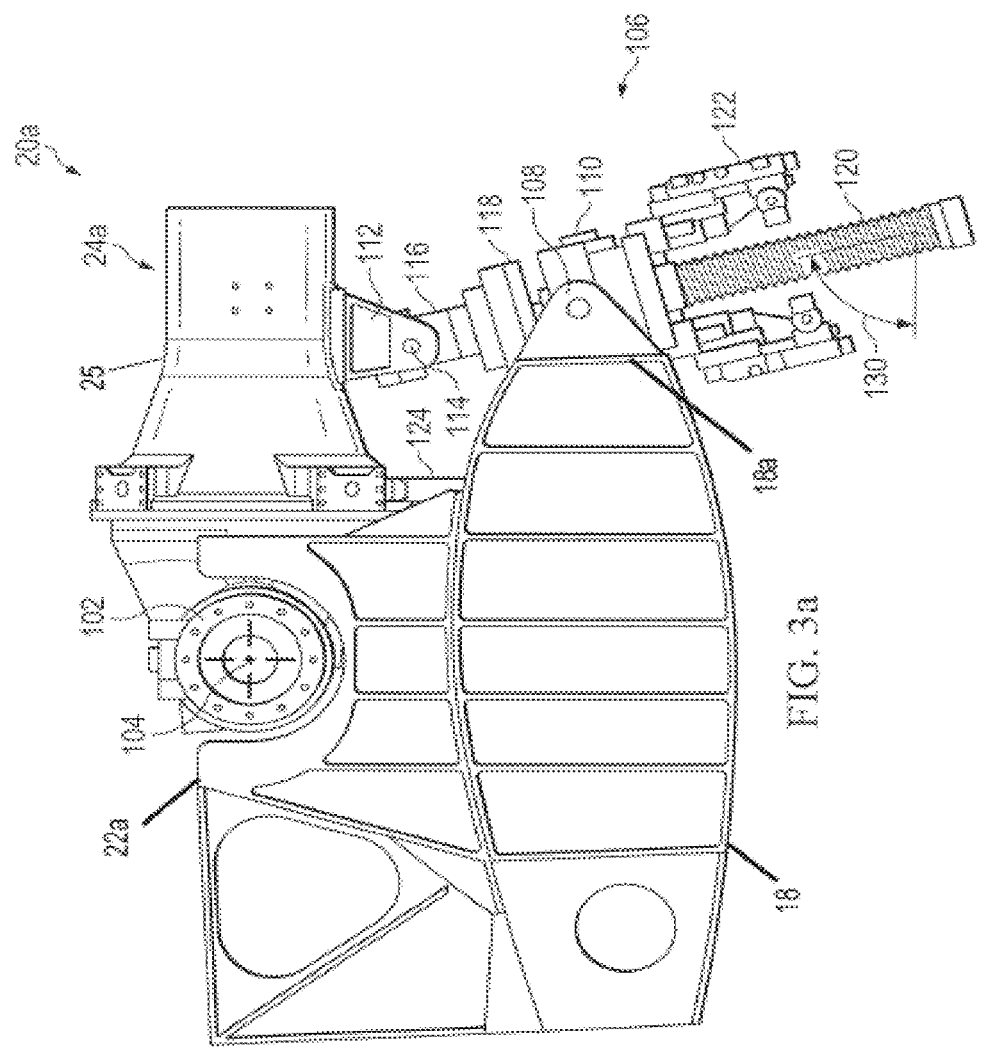

PYLON CONVERSION ACTUATOR FOR TILTROTOR AIRCRAFT

TECHNICAL FIELD OF THE DISCLOSURE

The present disclosure relates, in general, to tiltrotor aircraft that have a hover flight mode and a forward flight mode and, in particular to an improved pylon conversion system optimized for use on a tiltrotor aircraft.

BACKGROUND

An example of an aircraft is a tiltrotor aircraft. A tiltrotor aircraft generally has a rotor system that can selectively rotate relative to a body and wings. A tiltrotor aircraft can operate in a hover flight mode by vertically orienting its rotor systems into an upright position. In hover flight mode, the tiltrotor aircraft generates a lifting force by rotating a plurality of rotor blades, which allows the tiltrotor aircraft to make vertical takeoffs or vertical landings with little or no forward momentum. The tiltrotor aircraft can also operate in a forward flight mode by horizontally orienting its rotor systems in a forward position. In forward flight mode, the tiltrotor aircraft generates a lifting force by running an airflow over an aerodynamic wing surface, which allows the tiltrotor aircraft to reach a greater forward airspeed than would otherwise be possible in hover flight mode.

Some tiltrotor aircraft have a propulsion assembly comprising a fixed pylon system and a rotor system. A pylon conversion actuator mounted to the fixed pylon system can rotate the rotor system between an upright position and a forward position.

FIGS. 1a and 1b are front views of an exemplary prior art propulsion assembly 20a including a rotor system 24a, a fixed pylon 22a, a pylon conversion actuator 28 and an adapter fitting 30. The rotor system 24a is mounted to and can selectively rotate about the fixed pylon 22a. In turn, the pylon conversion actuator 28 is mounted to the fixed pylon 22a in a vertical orientation. The adapter fitting 30 is in mechanical communication with both the rotor system 24a and pylon conversion actuator 28. The pylon conversion actuator 28 comprises an extendable arm capable of retracting and extending. As the extendable arm retracts and extends, the pylon conversion actuator 28 pulls and pushes on the adapter fitting 30, causing the rotor system 24a to rotate about the fixed pylon 22a between the forward position, as best seen in FIG. 1a, and the upright position, as best seen in FIG. 1b. It has been found, however, that rotor systems, including rotor systems that use an adapter fitting, are structurally complex and prohibitively heavy.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3a-3b are cross-sectional side-views of a propulsion assembly in a forward position and an upward position with a pylon conversion actuator in retracted mode and extended mode, respectively, in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation can be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference can be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein can be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein can be oriented in any desired direction. In addition, as used herein, the term "coupled" can include direct or indirect coupling by any means, including moving and/or non-moving mechanical connections.

Figure 1A:
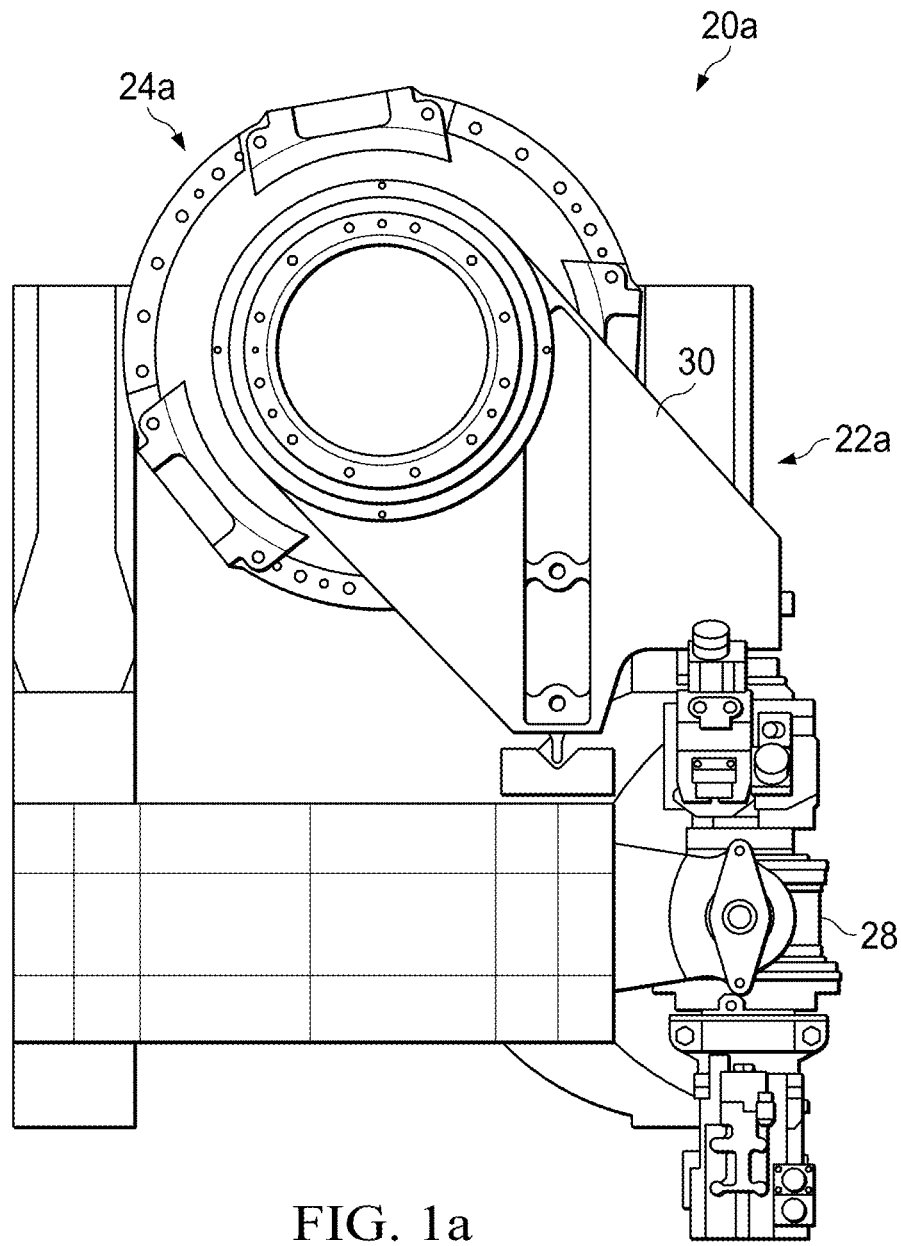
FIGS. 1a-1b are cross-sectional front views of a prior art propulsion assembly in a forward position and an upward position, respectively.
Figure 1B:
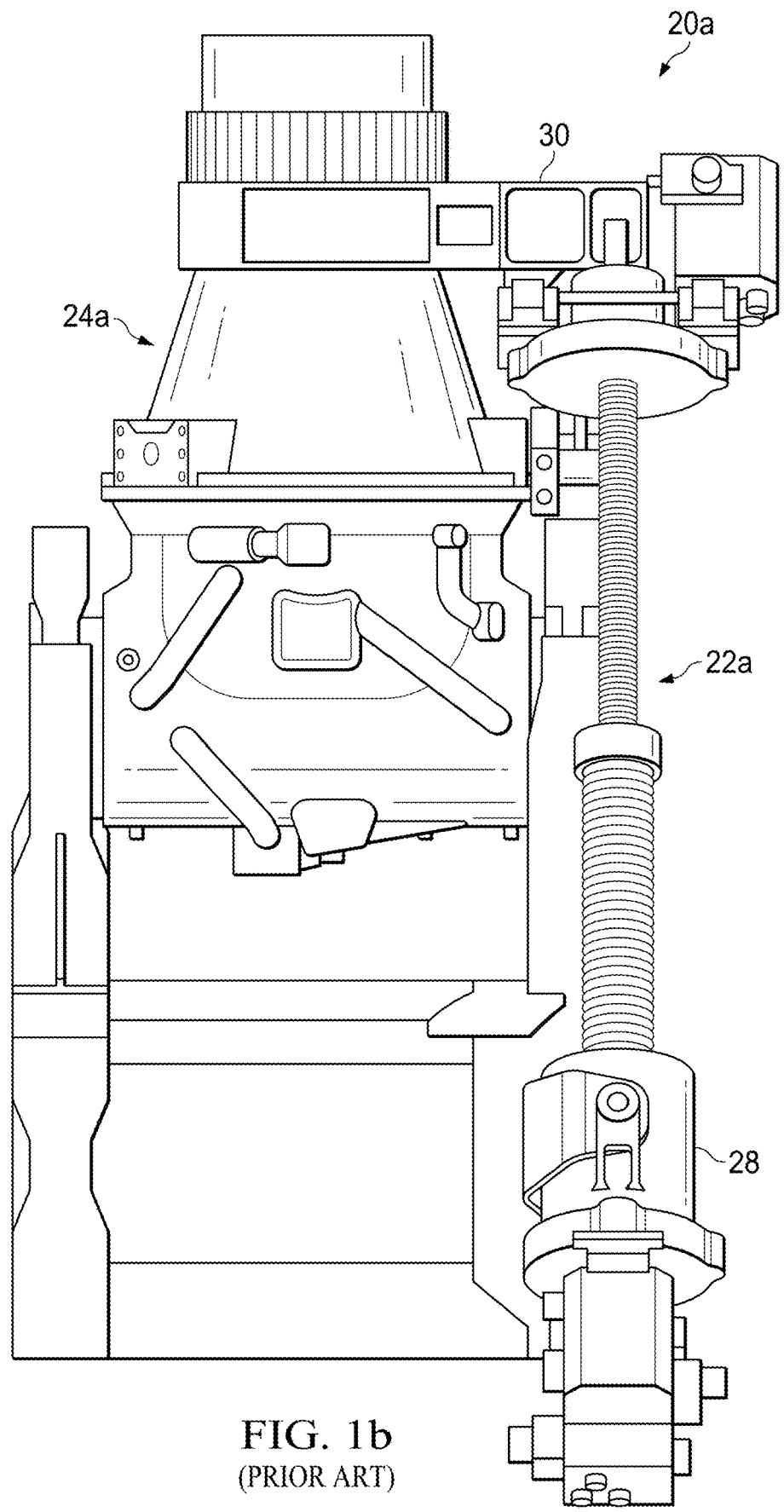
Figure 2A:
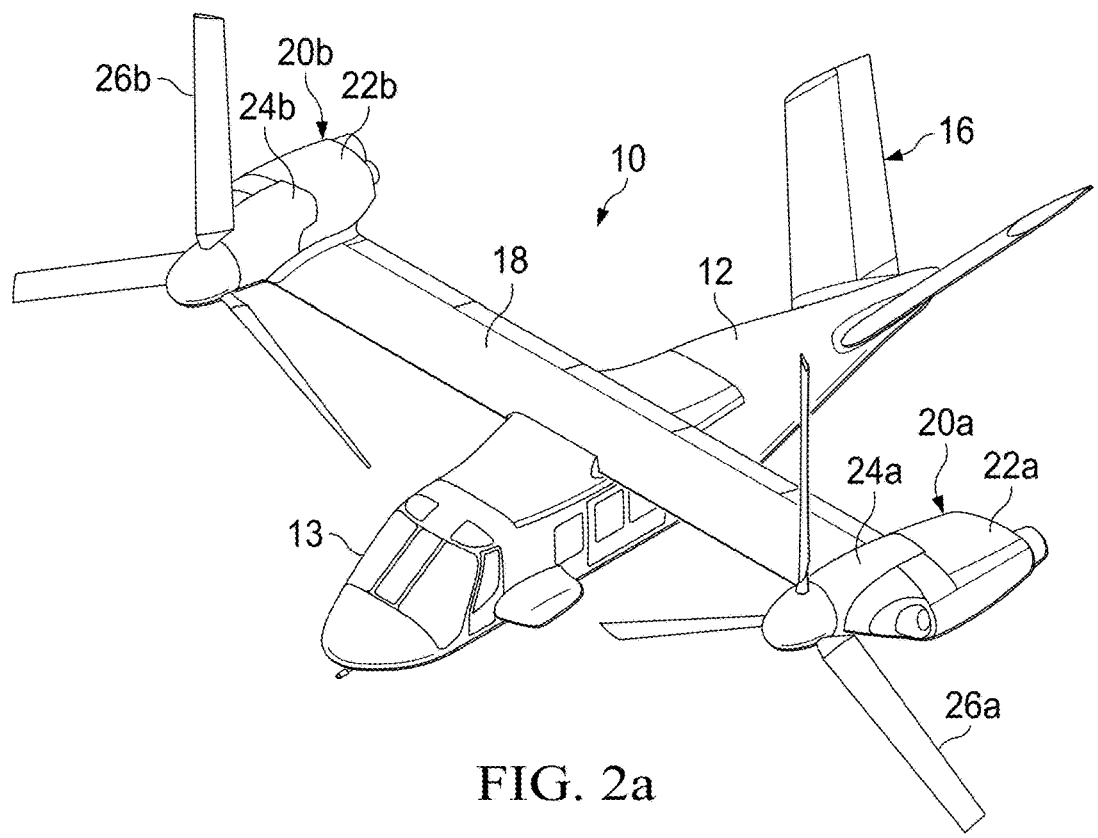
FIGS. 2a-2b are schematic illustrations of an exemplary aircraft in forward flight mode and in hover flight mode, respectively, in accordance with embodiments of the present disclosure.
Figure 2B:
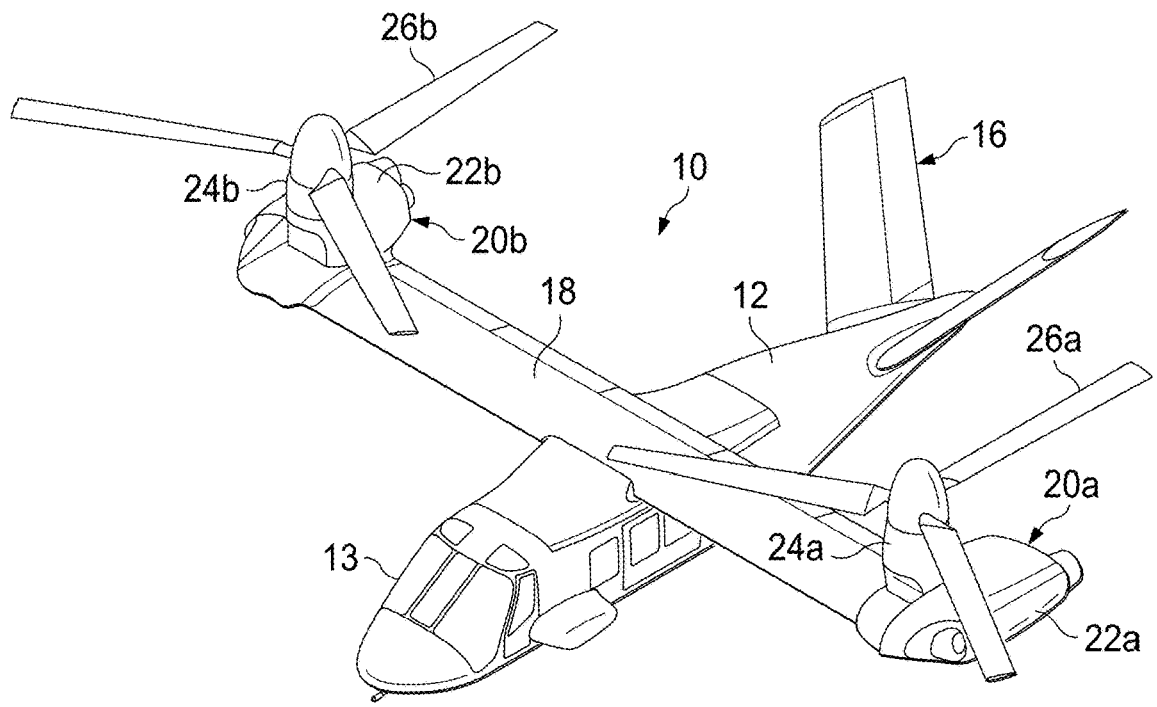

Referring to FIGS. 2a-2b in the drawings, a tiltrotor aircraft is schematically illustrated and generally designated 10. Aircraft 10 includes a fuselage 12, a cockpit 13, and a wing assembly 18 and a tail assembly 16 each having control surfaces operable for horizontal and/or vertical stabilization during flight. Located at the outboard ends of wing assembly 18 are propulsion assemblies 20a, 20b. Propulsion assembly 20a includes a nacelle depicted as fixed pylon 22a that houses an engine and transmission. In addition, propulsion assembly 20a includes a rotor system 24a that is rotatable relative to fixed pylon 22a between a forward position, as best seen in FIG. 1a, and an upright position, as best seen in FIG. 1b. Propulsion assembly 20a also includes a rotor blade 26a that is rotatable relative to the rotor system 24a responsive to torque and rotational energy provided via a rotor hub assembly and drive system mechanically coupled to the engine and transmission. Likewise, propulsion assembly 20b includes a nacelle depicted as fixed pylon 22b that houses an engine and transmission, a rotor system 24b that is rotatable relative to fixed pylon 22b and a rotor blade 26b that is rotatable relative to the rotor system 24b responsive to torque and rotational energy provided via a rotor hub assembly and drive system mechanically coupled to the engine and transmission.

FIG. 2a illustrates aircraft 10 in a forward flight mode, in which rotor blades 26a, 26b are oriented in a substantially vertical plane to provide a forward thrust enabling the wing assembly 18 to provide a lifting force responsive to forward airspeed, such that aircraft 10 flies much like a conventional propeller driven aircraft. In forward flight mode, the rotor systems 24a, 24b are horizontally oriented in the forward position, substantially parallel with fixed pylons 22a, 22b respectively. Additionally, in forward flight mode, the aircraft 10 can reach greater forward airspeeds than would otherwise be possible.

FIG. 2b illustrates aircraft 10 in hover flight mode, in which rotor blades 26a, 26b are rotating in a substantially horizontal plane to provide a lifting thrust, such that aircraft 10 flies much like a conventional helicopter. In hover flight mode, the rotor systems 24a, 24b are vertically oriented in the upright position, substantially perpendicular to the fixed pylons 22a, 22b respectively. Additionally, in hover flight mode, the aircraft 10 can make vertical landings and vertical takeoffs with little or no forward momentum. It should be appreciated that aircraft 10 can be operated such that rotor blades 26a, 26b are selectively positioned between forward flight mode and hover flight mode, which can be referred to as a conversion flight mode.

Figure 3B:
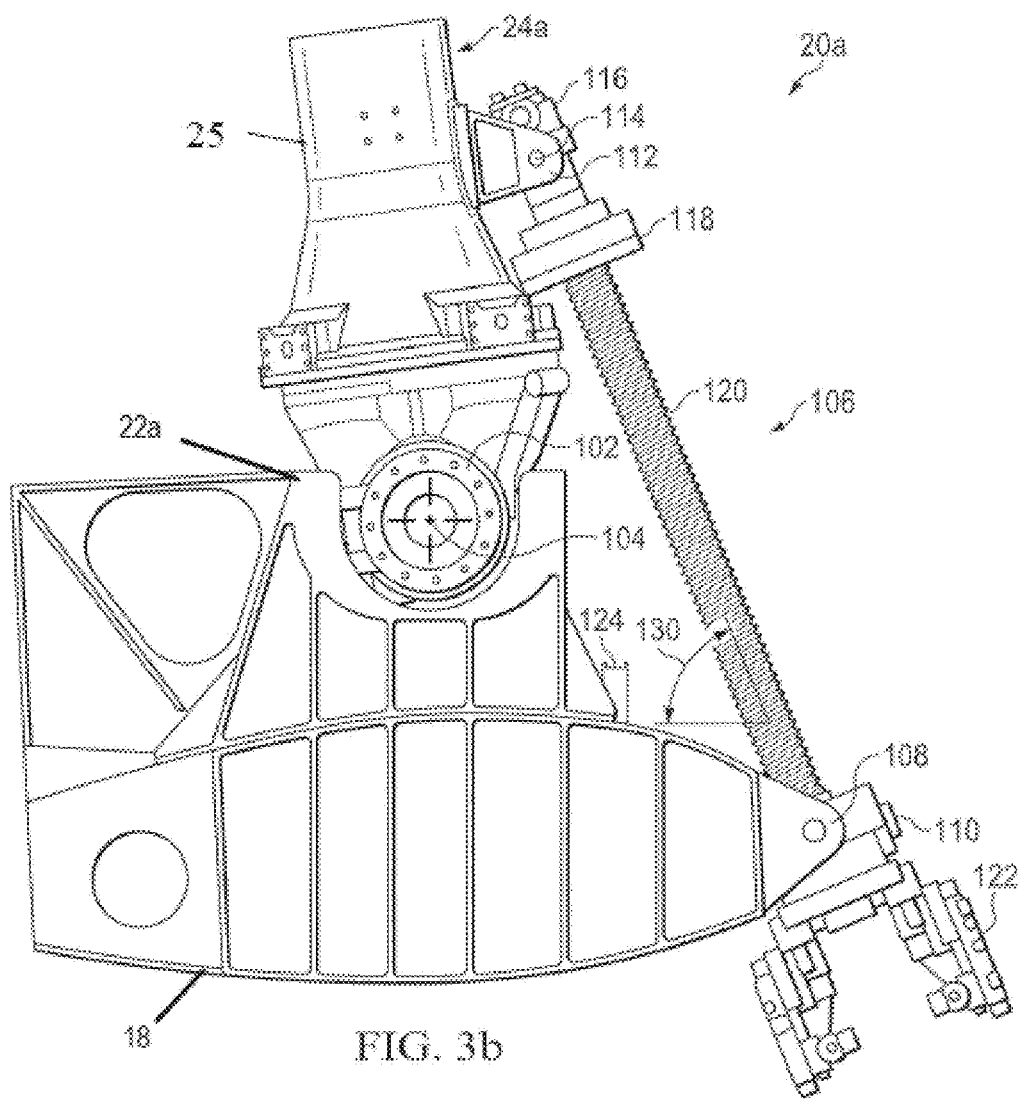

FIGS. 3a-3b illustrate cross-sectional side views of the propulsion assembly 20a. It should be noted that the below discussion of propulsion assembly 20a is applicable to propulsion assembly 20b. The propulsion assembly 20a includes the rotor system 24a, the fixed pylon 22a, and a pylon conversion actuator 106. Rotor system 24a includes a pivotable attachment 102 that couples the rotor system 24a to the fixed pylon 22a. The pivotable attachment 102 allows the rotor system 24a to selectively rotate about a conversion axis 104 into the forward position, as best seen in FIG. 3a, and into the upright position, as best seen in FIG. 3b. It should be appreciated that rotor system 24a can be selectively positioned between the forward position and upright position as well.

The pylon conversion actuator 106 includes an extendable arm 120, an actuator platform 118, and a primary power source 116. The primary power source 116 is mounted to the top of the actuator platform 118, which in turn is fixed proximate to the upper end of the extendable arm 120. In certain embodiments, the primary power source 116 is a hydraulic motor; but the primary power source 116 can include multiple motors, different motor types, batteries, generators, and other suitable devices. Additionally, the pylon conversion actuator 106 can include one or more redundant power sources 122 mounted to the bottom structure of the pylon conversion actuator 106. In certain embodiments, the redundant power source 122 is a hydraulic motor; but the redundant power source 122 can include multiple motors, different motor types, batteries, generators, and other suitable devices. The primary power source 116 is used to power and move the extendable arm 120. If the primary power source 116 fails, the redundant power source 122 can power and move the extendable arm 120. The extendable arm 120 can selectively retract into a retracted position, as best seen in FIG. 3a, and selectively extend into an extended position, as best seen in FIG. 3b. It should be appreciated that the extendable arm 120 can selectively retract and extend between the retracted position and the extended position. In turn, as the extendable arm 120 retracts and extends, the actuator platform 118 is lowered and raised, respectively. In certain embodiments, the extendable arm 120 is a segmented telescoping bar; but the extendable arm 120 can include one or more of sliding mechanisms and other suitable mechanical devices.

The pylon conversion actuator 106 is directly mounted to the rotor system 24a, shown as proprotor gearbox 25, and the wing 18 by a gimbal mount 110 and clevis mount 112. The gimbal mount 110 is below and forward of the clevis mount 112. As a result, the pylon conversion actuator 106 mounts to the proprotor gearbox 24a and wing at an angle 130.

The gimbal mount 110 is fixed to the wing 18 by a pair of pylon tangs 108, located along the leading forward edge 18a of the wing 18. An aperture opening extends through a central body of the gimbal mount 110. The pylon conversion actuator's 106 extendable arm 120 extends through the gimbal mount's 110 aperture opening, where it is secured in place by the gimbal mount 110. In both the retracted position and the extended position, the actuator platform 118 is situated above the gimbal mount 110; and, the actuator platform 118 is restricted from physically touching the gimbal mount 110. Additionally, the gimbal mount 110 allows the pylon conversion actuator 106 to selectively move within the confines of the aperture opening in a side-to-side motion and/or a forward to aft motion; however, the gimbal mount restricts the pylon conversion actuator 106 from moving in an up or down direction and absorbs tension and compression loads generated by the pylon conversion actuator 106.

The clevis mount 112 is fixed to the side surface of the proprotor gearbox 24a. The clevis mount 112 includes a pair of clevis tangs. The upper end of the pylon conversion actuator 106, proximate to the primary power source 116 and actuator platform 118, is situated between the clevis tangs and fastened to the rotor system 24a by a clevis joint 114. The clevis mount 112 allows the pylon conversion actuator 106 to selectively pivot about the clevis joint 114. As the extendable arm 120 of the pylon conversion actuator 106 retracts and extends, the pylon conversion actuator 106 will respectively pull and push on the clevis mount 112 and pivot the rotor system 24a about the conversion axis 104. As a result, when the extendable arm 120 retracts into the retracted position, the rotor system 24a rotates into the forward position, as best seen in FIG. 3a. Likewise, when the extendable arm 120 extends into the extended position, the rotor system 24a rotates into the upward position, as best seen in FIG. 3b. In both the forward position and upward position, the actuator platform 118 and primary power source 116 remain proximate to the clevis mount 112 and rotor system 24a. Note that selectively pivoting the pylon conversion actuator 106 about the clevis mount 112 causes the angle 130 to grow and shrink as the extendable arm 120 retracts and extends respectively.

FIG. 3a illustrates a cross-sectional side-view of the propulsion assembly 20a, with the rotor system 24a in the forward position. In the forward position, the rotor system 24a is partially supported by the surrounding structure of the fixed pylon 22a, the pivotable attachment 102, and a rotor downstop 124; wherein, the bottom surface of the rotor system 24a partially rests on top of the rotor downstop 124. Additionally, in the forward position, the pylon conversion actuator 106 (including the actuator platform 118, primary power source 116, and extendable arm 120) is situated beneath the rotor system 24a. As a result, the angle 130 formed by the pylon conversion actuator 106 is larger in the forward position than in the upright position shown in FIG. 3b. In the forward position, the extendable arm 120 of the pylon conversion actuator 106 retracts into the retracted position. In the retracted position, the actuator platform 118 is in close proximity to the gimbal mount 110; however, the actuator platform 118 does not physically touch the gimbal mount 110. Additionally, most of the extendable arm 120 extends past the aperture opening of the gimbal mount 110, below the bottom surface of the gimbal mount 110.

FIG. 3b illustrates a cross-sectional side-view of the propulsion assembly 20a, with the rotor system 24a in the upright position. In the upright position, the rotor system 24a is partially supported by the surrounding structure of the fixed pylon 22a and the pivotable attachment 102. Additionally, in the upright position, the pylon conversion actuator 106 (including the actuator platform 118, primary power source 116, and extendable arm 120) partially rotates or pivots about the clevis mount 112 and is situated to the side of the rotor system 24a. As a result, the angle 130 formed by the pylon conversion actuator 106 is smaller in the upright position than in the forward position shown in FIG. 3a. In the upright position, the extendable arm 120 of the pylon conversion actuator 106 extends into the extended position. In the extended position, the actuator platform 118 moves further upward away from the gimbal mount 110. Additionally, most of the extendable arm 120 extends past the aperture opening of the gimbal mount 110, above the top surface of the gimbal mount 110.

Figure 4A:
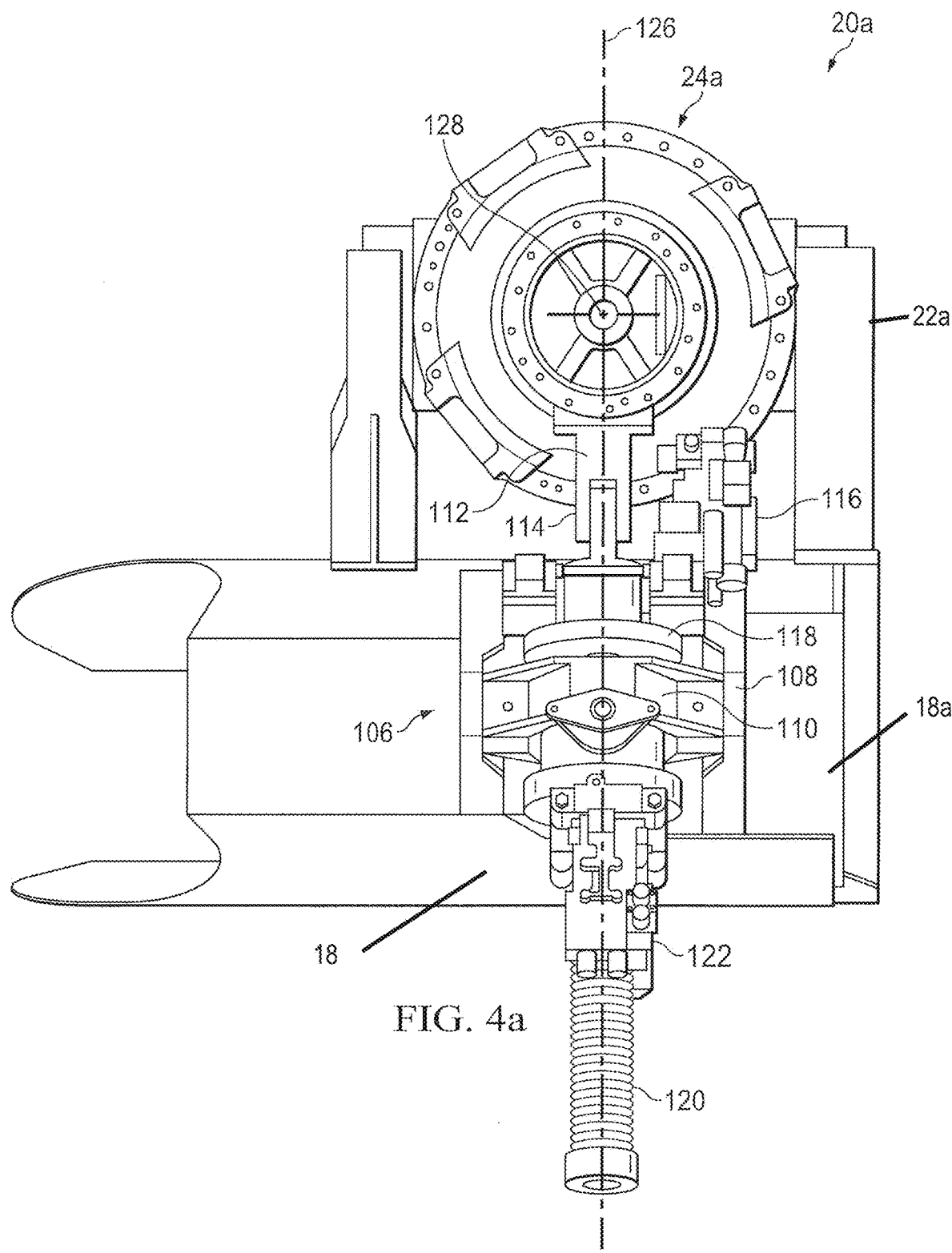
FIG. 4a-4b are cross-sectional front views of a propulsion assembly in a forward position and an upward position with a pylon conversion actuator in retracted mode and extended mode, respectively, in accordance with embodiments of the present disclosure.
Figure 4B:
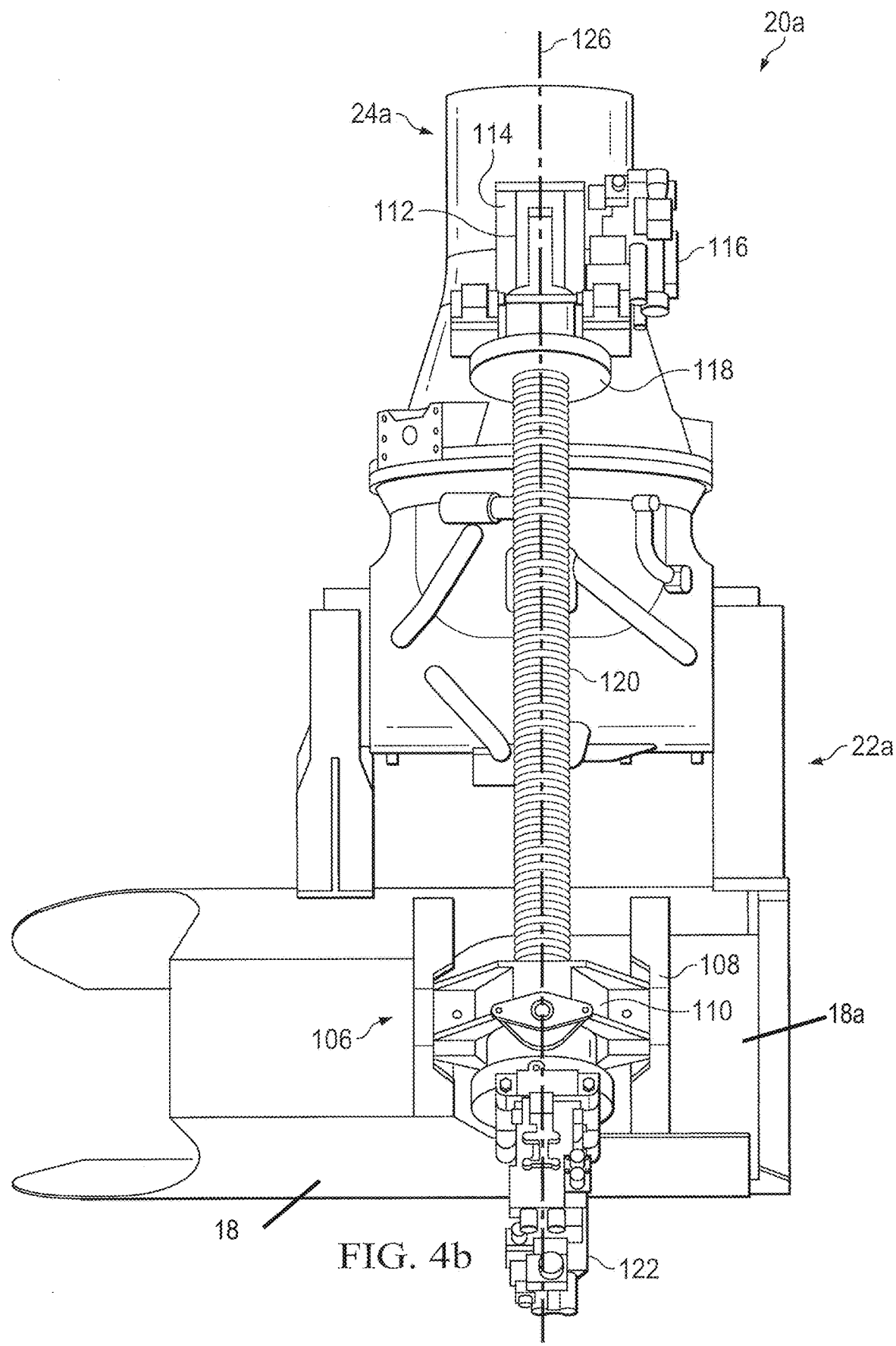

FIGS. 4a-4b illustrate cross-sectional front views of the propulsion assembly 20a, with the rotor system 24a in the forward position and upward position, respectively. In the illustrated embodiment, the pylon conversion actuator 106 is horizontally aligned with a rotor-system central axis 128. To accommodate this configuration, both the clevis mount 112 and gimbal mount 110 are horizontally aligned with one another about a vertical axis 126 that passes through the rotor system central axis 128.

Figure 5A:
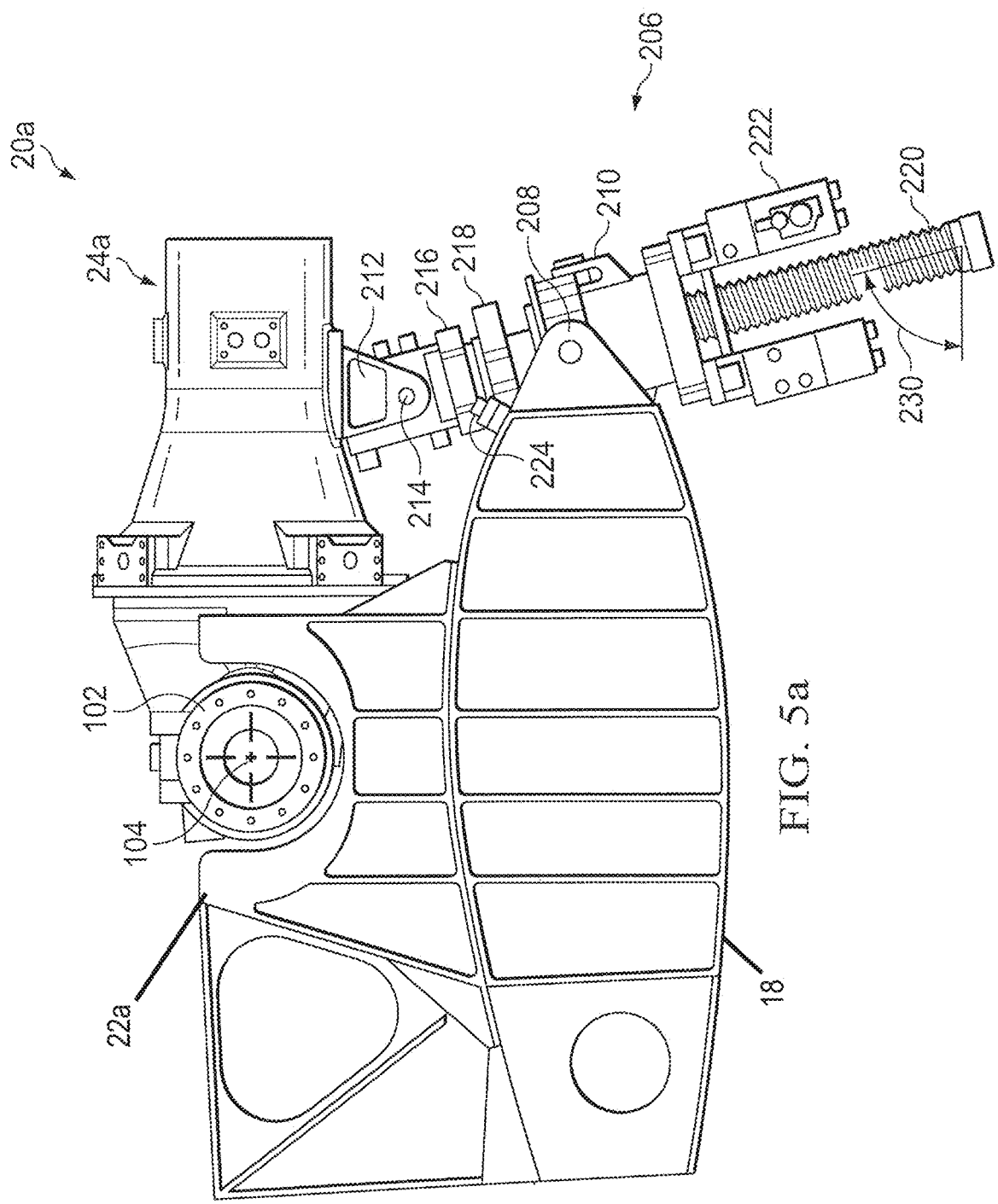
FIGS. 5a-5b are cross-sectional side-views of a propulsion assembly in a forward position and an upward position with a pylon conversion actuator in retracted mode and extended mode, respectively, in accordance with embodiments of the present disclosure.
Figure 5B:
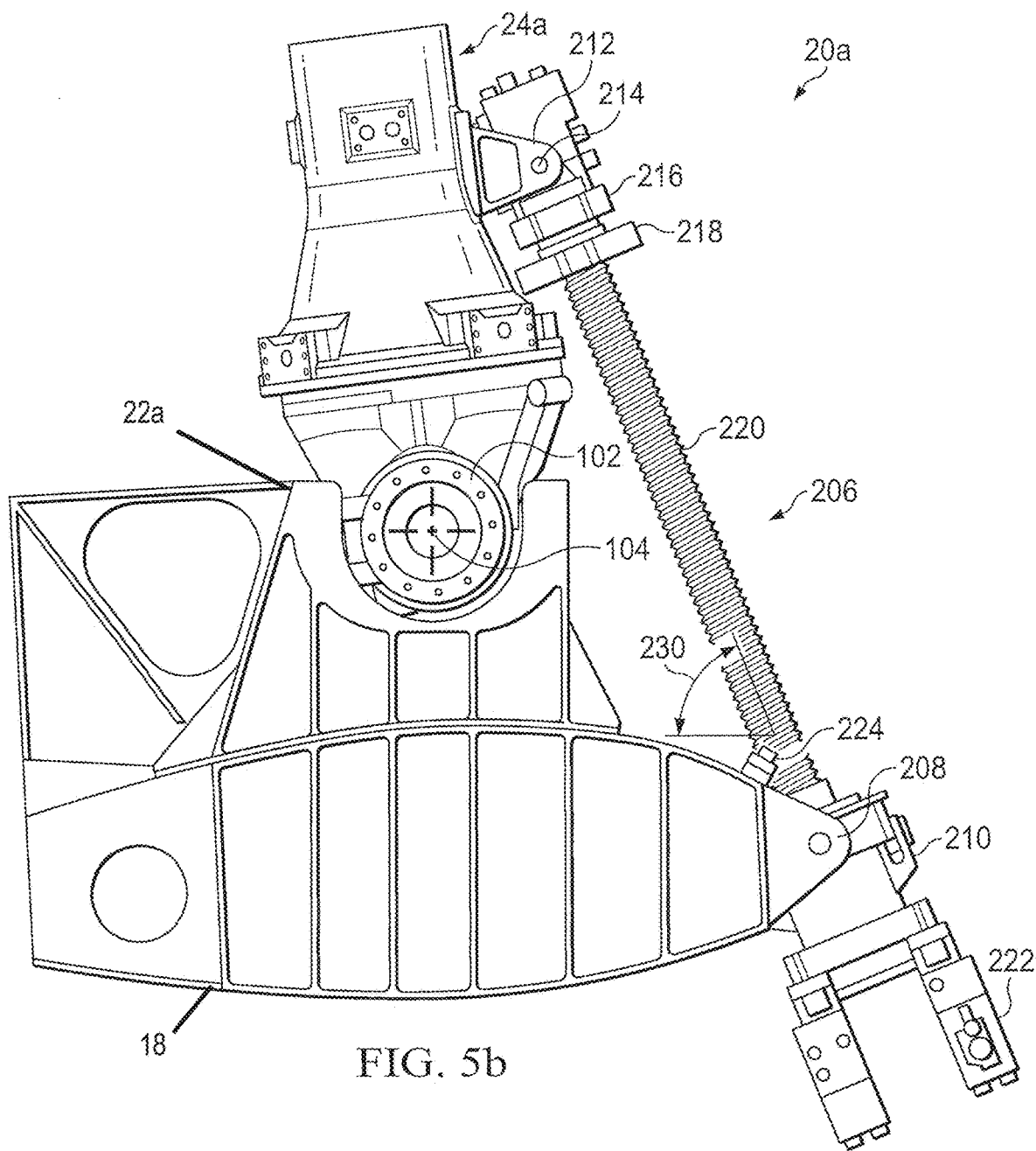

FIGS. 5a-5b illustrate cross-sectional side views of the propulsion assembly 20a, using an alternate pylon conversion actuator 206. In similar fashion to pylon conversion actuator 106, pylon conversion actuator 206 includes an extendable arm 220, an actuator platform 218, a primary power source 216, and redundant power source 222. Additionally, like pylon conversion actuator 106, the pylon conversion actuator 206 is mounted to the rotor system 24a and fixed pylon 22a by a clevis mount 212 and a gimbal mount 210 at an angle 230; wherein, the gimbal mount 210 is situated between a pair of pylon tangs 208 and the pylon conversion actuator 206 selectively extends while pivoting about 208 and 214 axes.

Figure 6A:
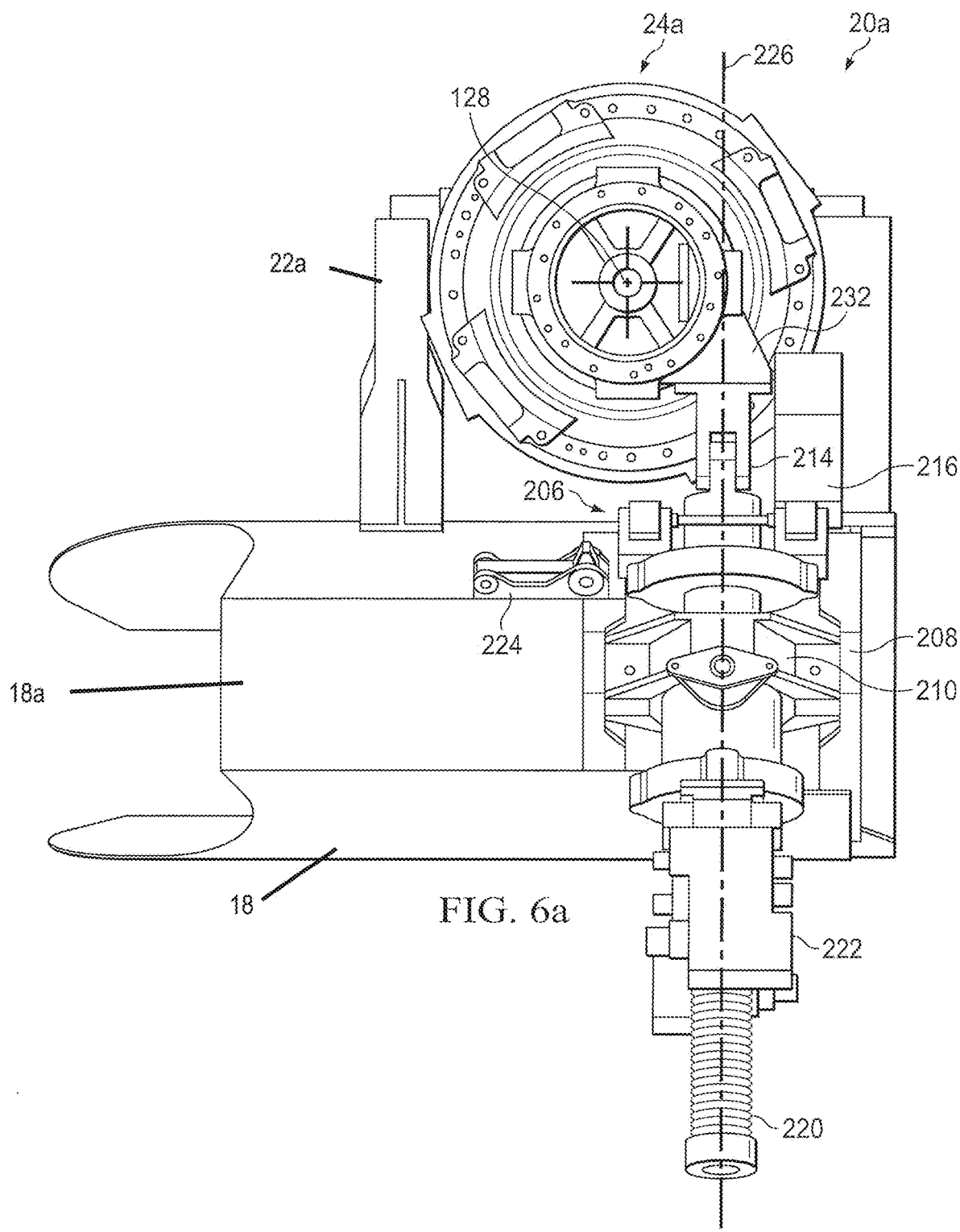
FIG. 6a-6b are cross-sectional front views of a propulsion assembly in a forward position and an upward position with a pylon conversion actuator in retracted mode and extended mode, respectively, in accordance with embodiments of the present disclosure.
Figure 6B:
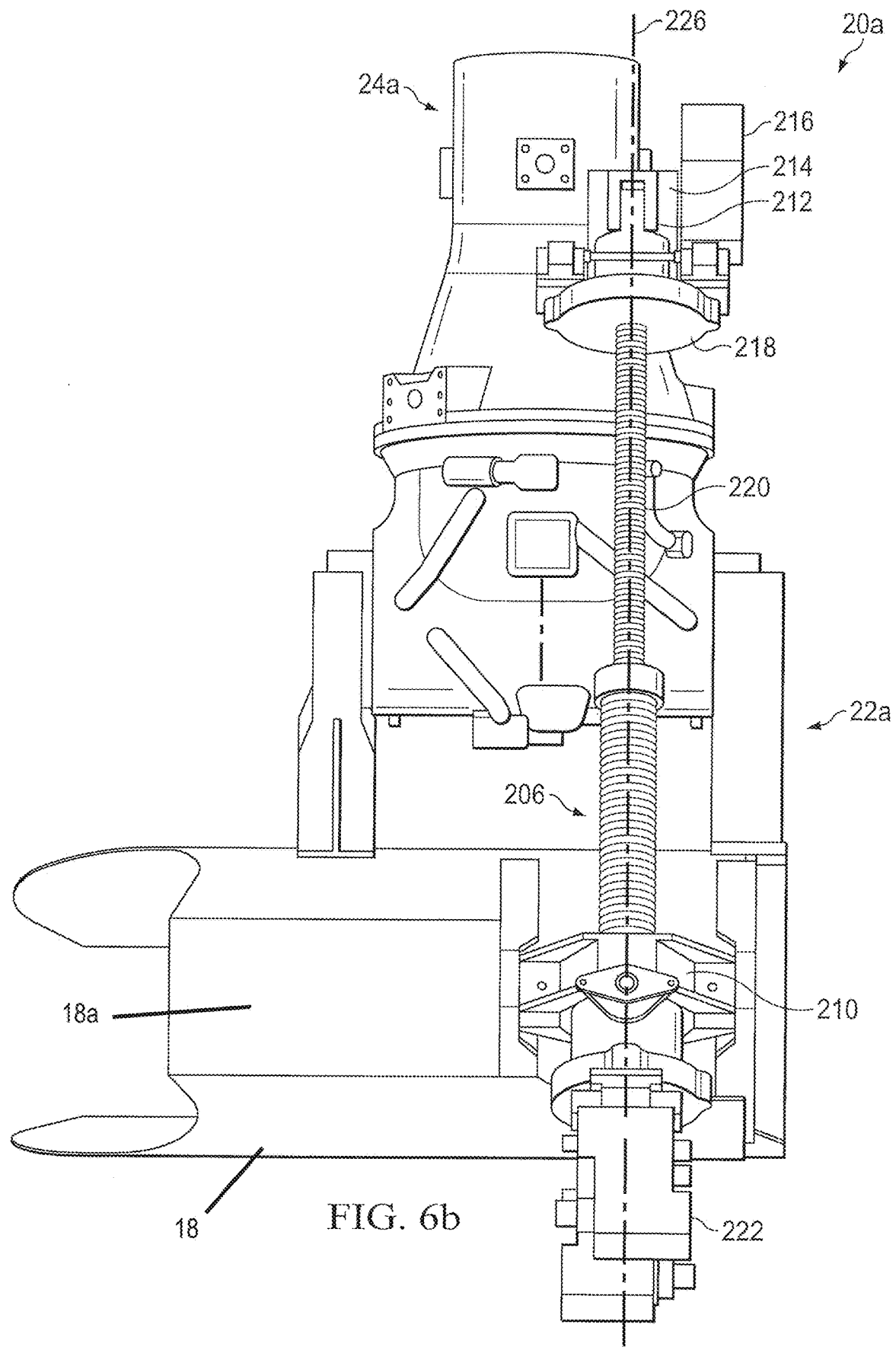

FIGS. 6a-6b illustrate cross-sectional front views of the propulsion assembly 20a using the alternate pylon conversion actuator 206, with the rotor system 24a in the forward position and upward position, respectively. Unlike pylon conversion actuator 106, pylon conversion actuator 206 is not horizontally aligned with the rotor system's central axis 128. Instead, the pylon conversion actuator is horizontally offset to the side of the rotor system's central axis 128, about a vertical axis 226. In the illustrated embodiment, the pylon conversion actuator 206 is positioned to the right-hand side (i.e., outboard of wing assembly 18) of the rotor system's central axis 128; however, the pylon conversion actuator 206 may also be positioned to the left-hand side (i.e., inboard of the wing assembly 18) of the rotor system's central axis 128. To accommodate this offset configuration, the clevis mount 212 is fixed to a rotor system protrusion 232 extending from the rotor system 24a. Both the rotor system protrusion 232 and clevis mount 212 align with the vertical axis 226. Additionally, the pylon tangs 208 are positioned to the side of the rotor system central axis 128, to better align the gimbal mount 210 with the vertical axis 226. It should be appreciated that the offset orientation of the pylon conversion actuator 206 allows a rotor downstop 224 to be positioned further forward along the fixed pylon 22a, as best seen in FIGS. 5a and 5b.

Figure 7:
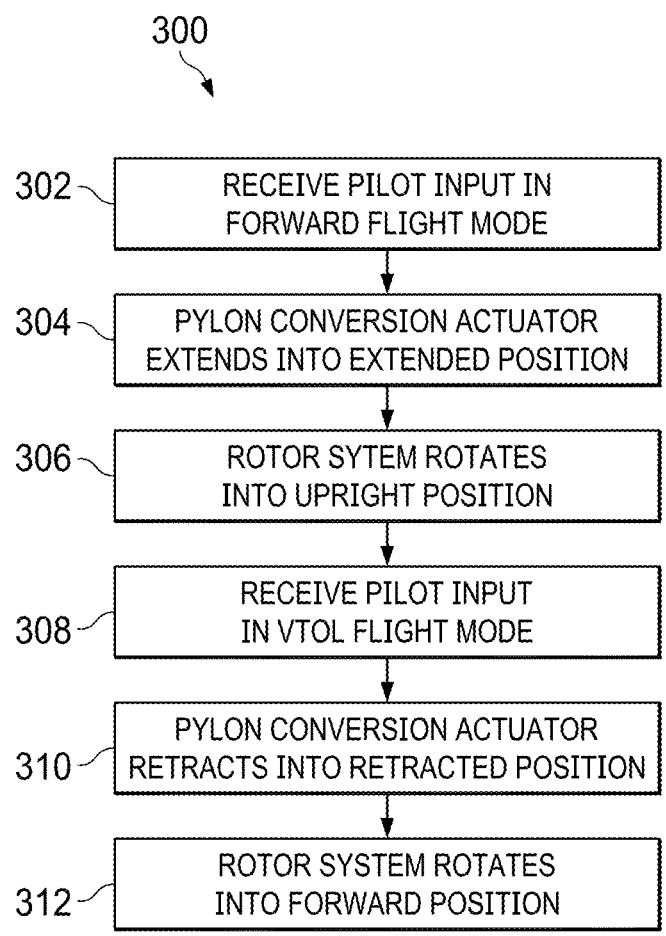
FIG. 7 is a flowchart of a method 300 of controlling a propulsion assembly.

Referring to FIG. 7, the cockpit 13, in addition to housing a pilot, contains pilot instrumentation that is in mechanical or electronic communication with the propulsion assemblies 20a and 20b and is capable of receiving pilot input. FIG. 7 is a flow chart of a method 300 of controlling the propulsion assemblies 20a and 20b and their respective rotor systems 24a and 24b and pylon conversion actuators using one or more pilot inputs. In step 302 of the method 300, a pilot input is received mid-flight, while the aircraft 10 is in forward flight mode. In step 304, the pilot input prompts the pylon conversion actuators of both propulsion assemblies 20a and 20b to extend into the extended position. In step 306, the rotor systems 24a, 24b are rotated into the upright position. In step 308, a pilot input is received mid-flight, while the aircraft 10 is in hover flight mode. In step 310, the pilot input prompts the pylon conversion actuators of both propulsion assemblies 20a and 20b to retract into the retracted position. In step 312, the rotor systems 24a and 24b are rotated into the forward position.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of using an instrument system in communication with a pylon conversion actuator for a tiltrotor aircraft comprising a wing extending outboard of a fuselage, a fixed pylon mounted on top of the wing, a rotor system having rotor blades rotatable about a central rotor axis pivotably mounted on the fixed pylon to rotate about a conversion axis, and the pylon conversion actuator directly coupled to the wing by a lower mount and directly coupled to the rotor system by an upper mount, wherein the pylon conversion actuator comprises a platform fixed to an end of an extendable arm that is positioned below and in the same vertical plane as the central rotor axis, the platform located between the upper mount and the lower mount, and a motor mounted on the platform and operable to actuate the extendable arm between an extended position and a retracted position, wherein the extendable arm extends through and below the lower mount in the extended position, the method comprising:
  receiving a signal from an instrument system;
  determining whether the pylon conversion actuator is in the extended position or the retracted position;
  sending a command to the pylon conversion actuator to retract to the retracted position if the pylon conversion actuator is in the extended position; and
  sending a command to the pylon conversion actuator to extend to the extended position if the pylon conversion actuator is in the retracted position.

2. The method of claim 1 further comprising:
  placing the rotor system into a first rotor position by extending the pylon conversion actuator into the extended position; and
  placing the rotor system into a second rotor position by retracting the pylon conversion actuator into the retracted position.

3. The method of claim 2 wherein:
  the first rotor position is an upright position; and
  the second rotor position is a forward position.

4. The method of claim 1, wherein the rotor system comprises a proprotor gearbox and the upper mount directly coupled to the proprotor gearbox.

5. The method of claim 1, wherein at least one of the upper mount or the lower mount is a gimbal.

6. The method of claim 1, wherein the upper mount is a clevis and the lower mount is a gimbal.

7. The method of claim 6, wherein the rotor system comprises a proprotor gearbox and the upper mount directly coupled to the proprotor gearbox.

8. The method of claim 6, wherein the lower mount is located on a leading edge of the wing.

9. The method of claim 8, wherein the rotor system comprises a proprotor gearbox and the upper mount directly coupled to the proprotor gearbox.

10. A tiltrotor aircraft, the aircraft comprising:
  a fuselage body;
  a wing;
  a first fixed pylon mounted on top of the wing;
  a first rotor system having a first proprotor gearbox, first rotor blades rotatable about a first central rotor axis, the first proprotor gearbox pivotally coupled to the first fixed pylon to selectively rotate the first rotor system about a first conversion axis; and
  a first pylon conversion actuator comprising:
    a first lower mount directly coupled to the wing;
    a first upper mount directly coupled to the first proprotor gearbox and located aft of the first lower actuator mount; and
    a first extendable arm positioned below and in the same vertical plane as the first central rotor axis;
    a first platform fixed to an end of the first extendable arm and located between the first lower mount and the first upper mount and a first motor mounted on the first platform and operable to actuate the first extendable arm between a first retracted position and a first extended position where the first extendable arm extends through and below the first lower mount when in the first extended position;
    wherein in the first extended position, the first pylon conversion actuator places the first rotor system in a first upright position; and
    wherein in the first retracted position, the first pylon conversion actuator places the first rotor system in a first forward position.

11. The tiltrotor aircraft of claim 10 further comprising:
  a second fixed pylon mounted on top of the wing on an opposite side of the fuselage from the first fixed pylon;
  a second rotor system having a second proprotor gearbox, second rotor blades rotatable about a second central rotor axis, the second proprotor gearbox pivotally coupled to the second fixed pylon to selectively rotate the second rotor system about a second conversion axis;
  a second pylon conversion actuator comprising;
    a second lower mount directly coupled the wing;
    a second upper mount directly coupled to the second proprotor gearbox and located aft of the second lower actuator mount; and
    a second extendable arm positioned below and in the same vertical plane as the second central rotor axis;
    a second platform fixed to the second extendable arm and located between the second lower mount and the second upper mount and a second motor mounted on the second platform and operable to actuate the second extendable arm between a second retracted position and a second extended position where the second extendable arm extends through and below the second lower mount when in the second extended position;
    wherein in the second extended position, the second pylon conversion actuator places the second rotor system in a second upright position; and
    wherein in the second retracted position, the second pylon conversion actuator places the second rotor system in a second forward position.

12. The tiltrotor aircraft of claim 10, wherein at least one of the first lower mount and the first upper mount is a gimbal.

13. The tiltrotor aircraft of claim 10, wherein the first lower mount and the first upper mount is a gimbal.

14. The tiltrotor aircraft of claim 10, wherein the first lower mount is located on a leading edge of the wing.

15. The tiltrotor aircraft of claim 10, wherein the first lower mount is a gimbal and the first upper mount is a clevis.

16. The tiltrotor aircraft of claim 15, wherein the first lower mount is located on a leading edge of the wing.

* * * * *